United States Patent
Budda et al.

(10) Patent No.: US 9,764,395 B2
(45) Date of Patent: *Sep. 19, 2017

(54) CORNER RADIUS END MILL

(71) Applicant: ISCAR LTD., Tefen (IL)

(72) Inventors: Eliyahu Budda, Neve Ziv (IL); Alexander Khina, Kfar Vradim (IL)

(73) Assignee: Iscar, Ltd., Tefen (IL)

( * ) Notice: Subject to any disclaimer, the term of this patent is extended or adjusted under 35 U.S.C. 154(b) by 171 days.

This patent is subject to a terminal disclaimer.

(21) Appl. No.: 14/435,620

(22) PCT Filed: Nov. 5, 2013

(86) PCT No.: PCT/IL2013/050905
§ 371 (c)(1),
(2) Date: Apr. 14, 2015

(87) PCT Pub. No.: WO2014/076691
PCT Pub. Date: May 22, 2014

(65) Prior Publication Data
US 2016/0067796 A1 Mar. 10, 2016

Related U.S. Application Data

(63) Continuation of application No. 13/676,974, filed on Nov. 14, 2012, now Pat. No. 8,858,128.

(51) Int. Cl.
*B23C 5/10* (2006.01)

(52) U.S. Cl.
CPC .............. *B23C 5/10* (2013.01); *B23C 5/1009* (2013.01); *B23C 2210/0492* (2013.01);
(Continued)

(58) Field of Classification Search
CPC ... B23C 5/10; B23C 5/1009; B23C 2210/123; B23C 2210/082; B23C 2210/0492; B23C 2210/40
See application file for complete search history.

(56) References Cited

U.S. PATENT DOCUMENTS 6,602,029 B1    8/2003   George
6,846,135 B2    1/2005   Kuroda et al.
(Continued)

FOREIGN PATENT DOCUMENTS

JP         2006 297495     11/2006
WO    WO 2012/172710    12/2012

OTHER PUBLICATIONS

International Search Report in PCT/IL2013/050905, dated Mar. 5, 2014.
Written Opinion in PCT/IL2013/050905, dated Mar. 5, 2014.

*Primary Examiner* — Will Fridie, Jr.
(74) *Attorney, Agent, or Firm* — Womble Carlyle

(57) ABSTRACT

A corner radius end mill includes a blended gash extending along a cutting edge. The blended gash is formed in a corner sector of the end mill. The corner sector has a first half-sector and a second half-sector defined on opposite sides of an imaginary bisection line of the corner sector, the first and second half-sectors subtending equal angles about the imaginary bisection line. The blended gash extends from a first extremity and blends an end gash surface and flute rake surface of the corner radius end mill. The blended gash is spaced from a radial tangent point by a predetermined distance, and extends to a second extremity which is spaced apart from the axial line and the second half-sector.

20 Claims, 6 Drawing Sheets

(52) U.S. Cl.
CPC .. *B23C 2210/082* (2013.01); *B23C 2210/123* (2013.01); *B23C 2210/282* (2013.01); *B23C 2228/50* (2013.01); *Y10T 407/1946* (2015.01); *Y10T 407/1948* (2015.01)

(56) References Cited

U.S. PATENT DOCUMENTS

| | | |
|---|---|---|
| 6,929,434 B2 | 8/2005 | Prokop |
| 6,997,651 B2 | 2/2006 | Kawai et al. |
| 7,402,004 B2 | 7/2008 | Tanaka et al. |
| 2003/0180104 A1 | 9/2003 | Kuroda et al. |
| 2006/0060053 A1* | 3/2006 | Tanaka ............... B23C 5/10 83/663 |
| 2008/0273932 A1 | 11/2008 | Aoki |
| 2011/0217132 A1 | 9/2011 | Wells et al. |
| 2013/0071192 A1* | 3/2013 | Kuroda ............... B23C 5/10 407/54 |
| 2014/0003873 A1* | 1/2014 | Han ............... B23C 5/10 407/54 |
| 2014/0341662 A1 | 11/2014 | Yamayose |
| 2015/0056027 A1* | 2/2015 | Azegami ............... B23C 5/1009 407/54 |
| 2015/0224585 A1* | 8/2015 | Kuroda ............... B23C 5/1009 407/54 |
| 2016/0175948 A1* | 6/2016 | Sakai ............... B23C 5/1009 407/54 |
| 2016/0303664 A1* | 10/2016 | Azegami ............... B23C 5/1009 |

* cited by examiner

CORNER RADIUS END MILL

RELATED APPLICATIONS

This is a 371 US National Phase of International Patent Application No. PCT/IL2013/050905, filed 2013 Nov. 5, and published as WO2014/076991A1 on 2014 May 22. Priority is claimed via PCT/IL2013/050905 to U.S. patent application Ser. No. 13/676,974, which was filed 2012 Nov. 14 and issued as U.S. Pat. No. 8,858,128. The contents of the aforementioned applications are incorporated by reference in their entirety.

FIELD OF THE INVENTION

The subject matter of the present application relates to corner radius end mills for machining workpieces, and in particular to corner radius end mills of the type that have both an end gash and a blended gash.

BACKGROUND OF THE INVENTION

End mills types include ball, square and corner radius, with the subject matter of the present application relating to the latter type.

A corner radius end mill is normally formed with an end gash, and, to prevent unacceptable discontinuities, can be formed with a so-called blended gash.

Example end mills publications disclosing blended gashes are disclosed in National Aerospace Standard 986 (1973; sheet no. 55), and US 2011/0217132.

It is an object of the present invention to provide a new and improved corner radius end mill.

SUMMARY OF THE INVENTION

In accordance with a first aspect of the subject matter of the present application, there is provided a corner radius end mill configured for rotating about a rotation axis ($A_R$), comprising: a shank portion; and a cutting portion extending from the shank portion and having a diameter (D); the cutting portion comprising: a helical flute having a helix angle H which fulfills the condition $20°<H<60°$ and comprising a flute rake surface; a cutting tooth comprising a cutting edge which extends adjacent to the flute rake surface, and comprising a corner sector with a corner radius R which fulfills the condition $R>0.15D$, a first half-sector of the corner sector extending from an imaginary bisection line of the corner sector to a radial tangent point and a second half-sector of the corner sector extending from the imaginary bisection line to an axial tangent point, the first and second half-sectors subtending equal angles about the imaginary bisection line; an end gash surface extending adjacent the cutting edge and the flute rake surface; and a blended gash extending along the cutting edge from a first extremity located in the second half-sector in a direction away from the first half-sector and blending the end gash surface and the flute rake surface.

In accordance with another aspect of the subject matter of the present application, there is provided a corner radius end mill comprising a blended gash extending along the cutting edge, the blended gash comprising a first extremity located in the second half-sector and extending in a direction away from the first half-sector to blend an end gash surface and flute rake surface.

In accordance with yet another aspect of the subject matter of the present application, there is provided a corner radius end mill comprising a blended gash extending along the cutting edge, the blended gash comprising a first extremity located in the second half-sector and extending in a direction away from the first half-sector to blend an end gash surface and flute rake surface, the blended gash extending to a second extremity which is spaced-apart from an imaginary axial line and the second half-sector.

In accordance with still another aspect of the subject matter of the present application, there is provided a corner radius end mill configured for rotating about a rotation axis ($A_R$), comprising: a shank portion; and a cutting portion extending from the shank portion and having a diameter (D); the cutting portion comprising: a helical flute having a helix angle H which fulfills the condition $20°<H<60°$ and comprising a flute rake surface; a cutting tooth comprising a cutting edge which extends adjacent to the flute rake surface, and comprising a corner sector with a corner radius R which fulfills the condition $R>0.15D$, a first half-sector of the corner sector extending from an imaginary bisection line of the corner sector to a radial tangent point and a second half-sector of the corner sector extending from the imaginary bisection line to an axial tangent point, the first and second half-sectors subtending equal angles about the imaginary bisection line; an end gash surface extending adjacent the cutting edge and the flute rake surface; and a blended gash extending along the cutting edge from a first extremity located in the second half-sector in a direction away from the first half-sector and blending the end gash surface and the flute rake surface; the blended gash extending to a second extremity which is spaced-apart from an imaginary axial line and the second half-sector.

Spacing the second extremity from the imaginary axial line and the second half-sector has been found to significantly assist in reducing the size the blended gash. More precisely the blended gash's first extremity can be located closer to the imaginary axial line when spacing the second extremity from the imaginary axial line and the second half-sector.

In accordance with still another aspect of the subject matter of the present application, there is provided a corner radius end mill comprising a blended gash which is spaced from a radial tangent point by a predetermined distance.

In accordance with yet another aspect of the subject matter of the present application, there is provided a method of gashing a corner radius end mill, comprising a step of providing a blended gash on a corner radius end mill which extends in a direction towards an axial tangent point from a predetermined point spaced from a radial tangent point.

It will be understood that the above-said is a summary, and that any of the aspects above may further comprise any of the features described hereinbelow. Specifically, the following features, either alone or in combination, may be applicable to any of the above aspects:

A. The corner radius end mill can be configured for rotating about a rotation axis ($A_R$).
B. The corner radius end mill can comprise a shank portion, and a cutting portion extending from the shank portion and having a diameter D.
C. A cutting portion can comprising a helical flute having a helix angle H which fulfills the condition $20°<H<60°$. In some preferred embodiments, the helix angle H fulfills the condition $35°≤H≤45°$.
D. A helix range HR of all teeth of the corner radius end mill can be is equal to or less than two degrees multiplied by the number of teeth Z (helix range $HR≤2Z$).
E. A cutting portion can comprise a flute rake surface.

F. A cutting tooth can comprise a cutting edge which extends adjacent to a flute rake surface.
G. A cutting tooth can comprise a corner sector with a corner radius R. In some preferred embodiments, the corner radius R can fulfill the condition R>0.15D.
H. A first half-sector of a corner sector can extend from an imaginary bisection line to a radial tangent point and a second half-sector of the corner sector can extend from the imaginary bisection line to an axial tangent point. Stated differently, a corner sector can comprise a first half-sector and a second half-sector, the first half-sector extending from an imaginary bisection line of the corner sector to an imaginary radial line extending from a sector center point to a radial tangent point, and the second half-sector extending from the imaginary bisection line to an imaginary axial line extending from the sector center point to an axial tangent point.
I. No portion of the blended gash is in the first half-sector.
J. An end gash surface can extend adjacent the cutting edge and the flute rake surface
K. A blended gash can extend along a cutting edge from a first extremity located in a second half-sector in a direction away from a first half-sector, and blending an end gash surface and a flute rake surface.
L. A blended gash can extend to a second extremity which is spaced-apart from an imaginary axial line and the second half-sector, the imaginary axial line extending from a sector center point to the axial tangent point. Stated differently, the second extremity can be located on an opposing side of the imaginary axial line from the second half-sector. Such positioning has been found to reduce the discontinuity formed at the second extremity.
M. To assist in defining preferred position of the second extremity, an imaginary extremity line can be used. The second extremity can be located along the imaginary extremity line, which extends from the sector center point to the cutting edge. The imaginary extremity line forms an acute extremity angle $\alpha_3$ with the imaginary axial line. It has been found advantageous, for the reducing the discontinuity, when the second extremity is positioned such that the extremity angle $\alpha_3$ fulfills the condition ($3° \leq \alpha_3 \leq 30°$). Further reduction in the discontinuity can be achieved with the extremity angle $\alpha_3$ fulfilling the condition ($5° \leq \alpha_3 \leq 20°$). Best results have been achieved with the second extremity positioned such that extremity angle $\alpha_3$ fulfills the condition ($6° \leq \alpha_3 \leq 12°$). Stated differently, as the extremity angle $\alpha_3$ tends to 9° the discontinuity size has been found to be advantageously small.
N. A second half-sector can comprise a traverse sub-sector having a traverse central angle.
O. A traverse sub-sector can be distally located from a first half-sector, and wherein the blended gash extends into the second half-sector traversing the traverse sub-sector.
P. For some preferred embodiments, the traverse central angle can be 10°. In other preferred embodiments, the traverse central angle can be 25°.
Q. A second half-sector can comprise a boundary sub-sector having a boundary central angle. The boundary sub-sector can extend from an imaginary bisection line. The blended gash does not extend into the boundary sub-sector.
R. For some preferred embodiments, the boundary central angle can be 1°. In other preferred embodiments, the boundary central angle can be 2°.
S. The corner radius end mill can comprise a discontinuity formed at an intersection of the cutting edge, blended gash and flute rake surface is located at said axial side. More precisely, the discontinuity can form at least a 1° discontinuity angle. In some preferred embodiments the discontinuity forms at least a 2° discontinuity angle. Preferably, the discontinuity forms at most a 10° discontinuity angle. Even more preferably, the discontinuity forms at most a 6° discontinuity angle.
T. Preferably, a radial rake angle along an entirety of a radial portion of a cutting edge can have positive values. In some preferred embodiments, all values of the radial rake angle can be equal to or greater than 5°, and, for particularly preferred embodiments, preferably equal to or greater than 8°.
U. The corner radius end mill can be configured for cutting workpiece materials having a Rockwell's hardness less than 42 HRc. For example, such configuration can be a radial rake angle equal to or greater than 5° or 8°, etc.
V. The corner radius end mill can comprise at least one additional helical flute and associated cutting tooth comprising a blended gash. The blended gash can be as defined with any of the features mentioned hereinabove or below. The flute can be as defined with any of the features mentioned hereinabove or below. Preferably each helical flute and cutting tooth of the corner radius end mill are defined with one or more of the features mentioned hereinabove or below.
W. In some preferred embodiments, at the cutting end face, the corner radius end mill can have at least one index angle having a value different from at least one other index angle thereof. In particularly preferred embodiments, at the cutting end face, all index angles of the corner radius end mill can have different values.
X. In some preferred embodiments, at an equal-index-angle plane perpendicular to a rotation axis ($A_R$), the corner radius end mill can have all of the index angles thereof being equal. In particularly preferred embodiments, the equal-index-angle plane can be located in the middle of an active cutting portion of the cutting portion. The equal-index-angle plane can be the only plane at which all of the index angles are equal.
Y. The corner radius end mill can be produced by forming an end gash at an end thereof and then forming a blended gash which blends an end gash surface and an associated flute rake surface.
Z. A non-gashed corner area of the corner sector at the cutting edge, which is closer than a blended gash to a radial tangent point, can have a rake angle at least 5° greater than a rake angle of the blended gash at the cutting edge. The non-gashed corner area can be at boundary sub-sector of the second half-sector.

It has been found that providing a corner radius end mill, particularly one with one or more of the features described above, with a blended gash can machine a workpiece with lower power consumption and reduced vibrations.

While specific features described above might enhance such advantages, without being bound to theory, it is believed that by limiting an extent of a blended gash, a comparatively larger percentage of the cutting edge can be formed with relatively high value positive rake angles (e.g. angles of 5° and greater), thereby reducing power for machining a workpiece.

The use of high value positive rake angles has been found to be particularly beneficial for machining relatively soft materials (e.g. having a Rockwell's hardness less than 42

HRc, for example aluminum, stainless steel, plastic, composite materials, carbon fiber reinforced polymer CFRP).

Nonetheless, in theory, it is believed that such advantages may even be possible for harder materials (i.e. having a Rockwell's hardness of 42 HRc or greater) because an effective cutting length of the cutting edge can still be increased.

Surprisingly, the benefits in power reduction and reduced vibrations have offset potential difficulties of producing a smooth or tangential corner edge at an intersection of a cutting edge, blended gash and flute rake surface. Even in cases where a discontinuity (i.e. a point at which a function is not continuous) is formed, it has been surprisingly is that a suitable finish is achievable is formed at such intersection (such discontinuity being sufficiently small so as not to form a visual difference between surface textures on a workpiece, which are not permitted in some industries such as in the aerospace industry).

BRIEF DESCRIPTION OF THE DRAWINGS

For a better understanding of the subject matter of the present application, and to show how the same may be carried out in practice, reference will now be made to the accompanying drawings, in which.

DETAILED DESCRIPTION

Figure 1:
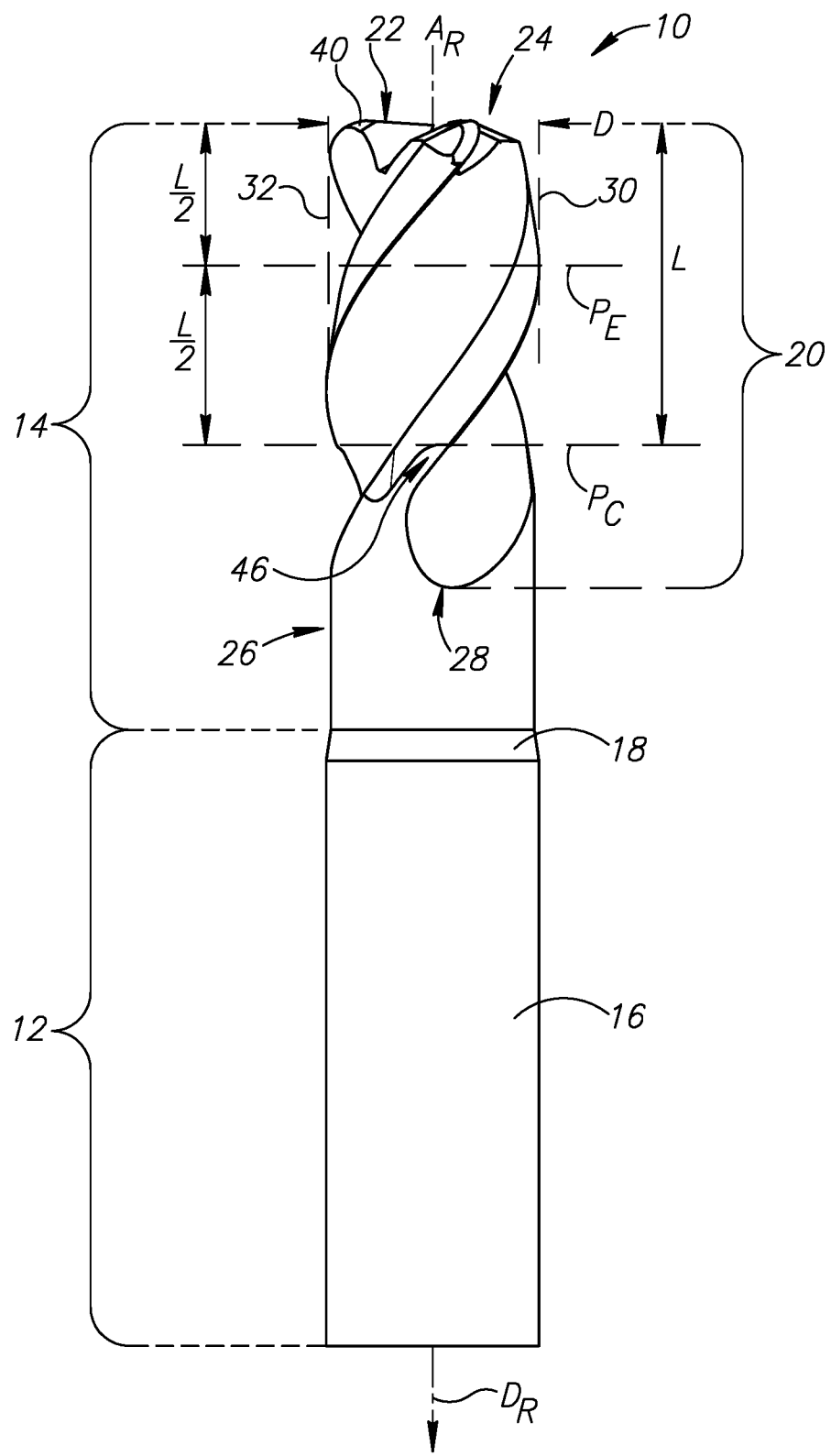
FIG. 1 is a side view of a corner radius end mill with a blended gash in accordance with an embodiment of the present invention.
Figure 4A:
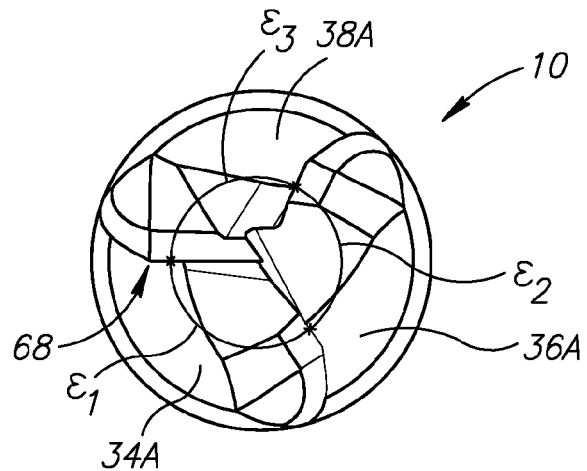
FIG. 4A is an end view of the end mill in FIG. 2A.
Figure 4B:
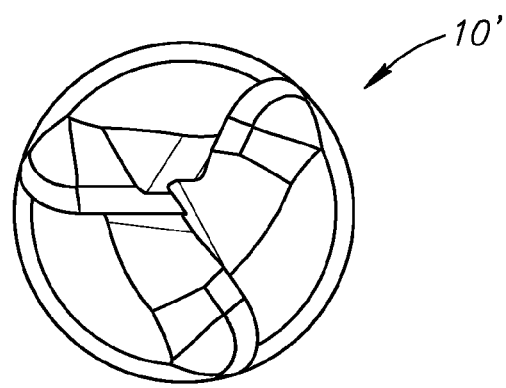
FIG. 4B is an end view of the end mill in FIG. 2B.
Figure 4C:
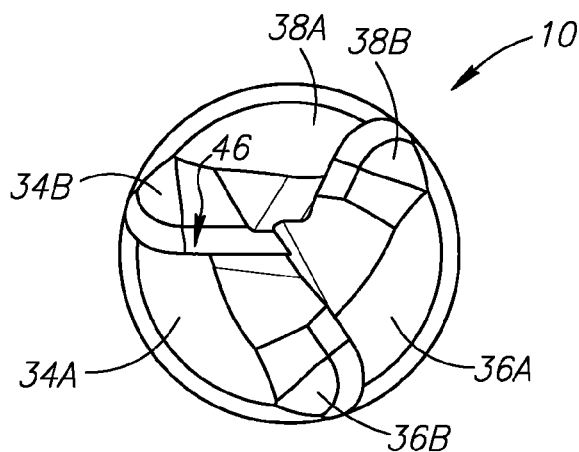
FIG. 4C is an end view of the end mill in FIG. 2C.

Reference is made to FIG. 1, which illustrates a corner radius end mill 10, typically made of extremely hard and wear-resistant material such as cemented carbide, and configured to rotate about a rotation axis ($A_R$) extending longitudinally through the center thereof in a counter-clockwise direction in the view shown in FIG. 4C.

The end mill 10 comprises a shank portion 12 and a cutting portion 14 extending therefrom.

The shank portion 12 can comprise a shank cylindrical portion 16 and a shank tapering portion 18 which extends between, and reducing in diameter from, the shank cylindrical portion 16 and the cutting portion 14.

The cutting portion 14 comprises a cutting fluted portion 20 extending along the rotation axis $A_R$ in a rearward axial direction $D_R$ from a cutting end face 22 located at an axial end 24 of the end mill 10.

The cutting portion 14 can also comprise a cutting neck portion 26 extending from the cutting fluted portion 20, or more precisely from the flute ends 28, to the shank portion 12.

A cutting portion's diameter D can be measured between imaginary peripheral extension lines 30, 32 at the cutting end face 22. While in this non-limiting example the extension lines 30, 32 are parallel to each other, due to the cylindrical shape of the cutting fluted portion 20, in some embodiments they need not be parallel (for example in an end mill having a conically shaped cutting fluted portion (not shown), extension lines can tend towards each other as they approach the axial end thereof). In the present non-limiting example, the cutting portion's diameter D is 16 mm.

Figure 2A:
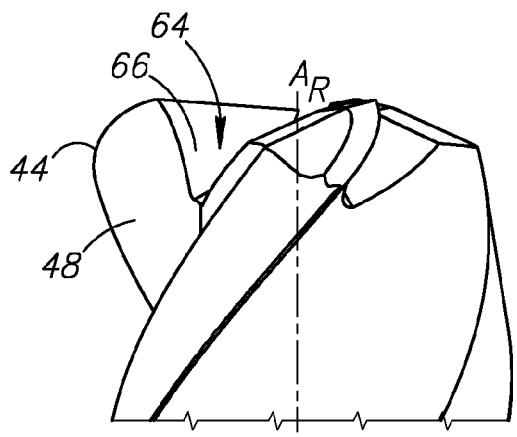
FIG. 2A is a partial side view of a cutting portion of an end mill without a blended gash.
Figure 2B:
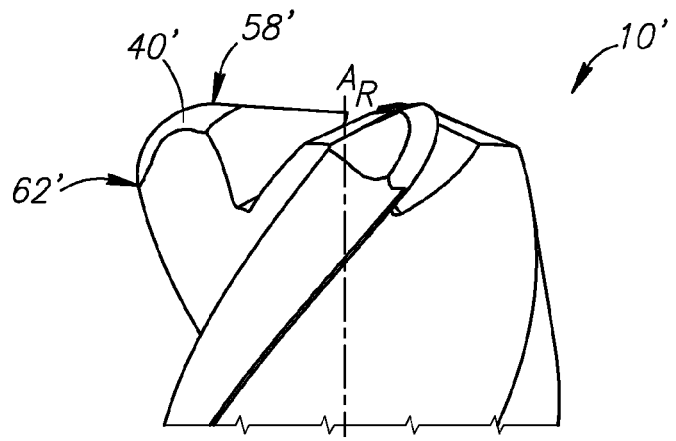
FIG. 2B is a partial side view of a cutting portion of an end mill with a prior art blended gash.
Figure 2C:
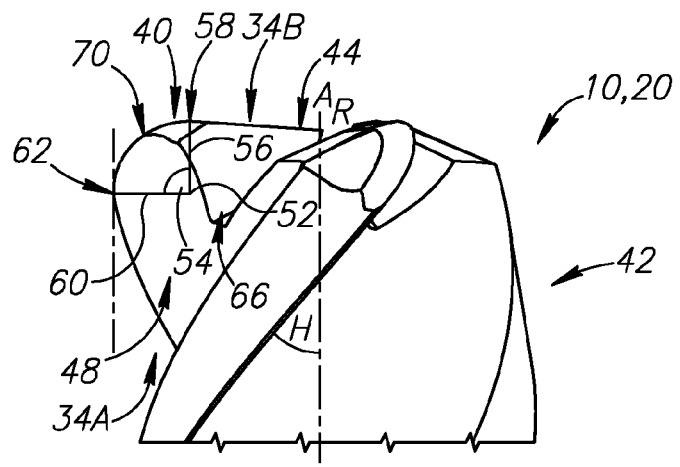
FIG. 2C is a partial side view of a cutting portion of the end mill in FIG. 1.

Referring to FIGS. 2C and 4C, the cutting fluted portion 20 comprises at least one helical flute (34A, 36A, 38A) and an associated cutting tooth (34B, 36B, 38B) extending adjacent thereto.

In general, it is preferable that each cutting tooth (34B, 36B, 38B) of the cutting portion 14 is of the type to be formed with a blended gash 40, i.e., extending from the axial end 24 to and along the end mill's periphery 42 (FIG. 2C).

Alternative to the non-limiting example shown, some end mill embodiments can have one or more, or all, of the cutting edges 44 thereof formed along the periphery 42 with variable radial rake angles (and not constant rake angles).

In general, it is preferable that each helical flute (34A, 36A, 38A) can have a helix angle H (FIG. 2C). A blended gash 40 of the subject matter of the present application has been found to improve performance of end mills. More precisely, such improvement has been found specifically for end mills with flutes having a helix angle H fulfilling the condition $20°<H<60°$.

In the non-limiting example shown, the helical flute designated as 34A has a helix angle of 41°, the helical flute 36A has a helix angle of 40°, and the helical flute 38A has a helix angle of 39°.

Alternative to the non-limiting example shown, some end mill embodiments can have one or more, or all, of the flutes formed with a variable helix angle flute (not shown), all values of each variable helix angle H of each flute should remain within the above-stated helix angle range of $20°<H<60°$.

It is preferable to minimize the difference in magnitude between the helix angles, which has been found to increase cutting depth to even twice the diameter of the end mill. To elaborate, it is preferred that the overall difference between the helix angles of the teeth (hereinafter the "helix range HR") be equal to or less than two degrees multiplied by the number of teeth Z (helix range $HR \leq 2Z$). For example, for an end mill with three teeth, the difference is preferred to be no greater than 6° (e.g. a first helix angle can be 38°, a second 40° and a third 42°). Superior performance may be found as the helix range HR decreases. For example the illustrated example in FIG. 2C has a helix range of HR of 2° (39° to 41°) which is believed to perform better than a helix range HR. Nonetheless, it is preferable that at least one, or preferably all, of the helix values of the different flutes differ somewhat, to reduce chatter.

Reverting to FIG. 1, it will be understood that an effective cutting length L of the cutting portion 14 extends from the cutting end face 22 to a cutting length plane $P_C$ extending perpendicular to the rotation axis ($A_R$) and located where the at least one helical flute (34A, 36A, 38A) begins to exit (i.e. become more shallow) and/or a point 46 at which a tooth relief surface of the associated cutting end mill 10 is no longer effective.

It has also been found that a blended gash 40 of the subject matter of the present application has been found to be particularly efficient for end mills with an equal-index-angle plane $P_E$ perpendicular to a rotation axis $A_R$, at which all index angles of an end mill are equal. The equal-index-angle plane $P_E$ has been found to produce superior results when being located in the middle of an active cutting portion of the cutting portion 14, i.e. an equal distance L/2 from the cutting end face 22 and the cutting length plane $P_C$.

The index angles at planes parallel with, but distinct from, the equal-index-angle plane can be different. In the non-limiting example shown, the index angles ($\epsilon_1$, $\epsilon_2$, $\epsilon_3$; FIG. 4A) at the cutting end face are all different (e.g. $\epsilon_1=120°$, $\epsilon_2=115°$ and $\epsilon_3=125°$).

It will be understood that each (i.e. every) cutting tooth (34B, 36B, 38B) and helical flute (34A, 36A, 38A) of the end mill 10 exemplified has the features described below, however this description, for simplification purposes only, will only be detailed regarding the helical flute and cutting tooth designated as 34A and 34B.

It will be understood that in addition to the type of cutting tooth described, which starts from an axial end of an end mill and comprises a corner radius, some embodiments can also comprise one or more additional cutting teeth which extend in a rearward direction from a location spaced apart from the axial end (not shown).

Figure 3A:
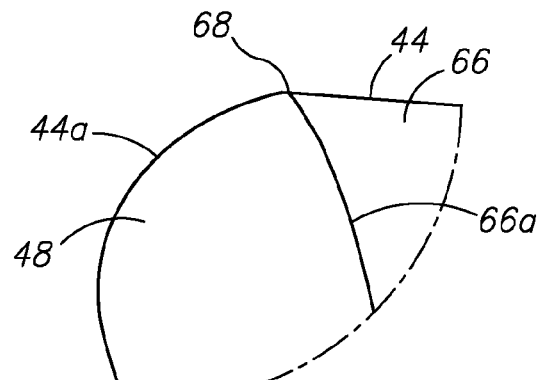
FIG. 3A is an enlarged view of a corner of the end mill in FIG. 2A.
Figure 3B:
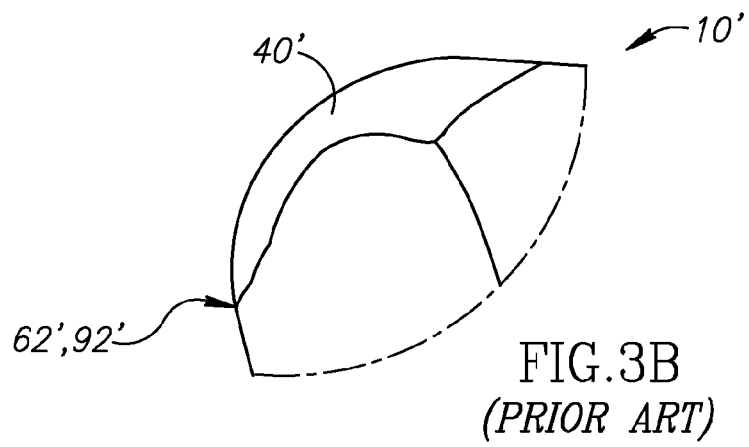
FIG. 3B is an enlarged view of a corner of the end mill in FIG. 2B.
Figure 3C:
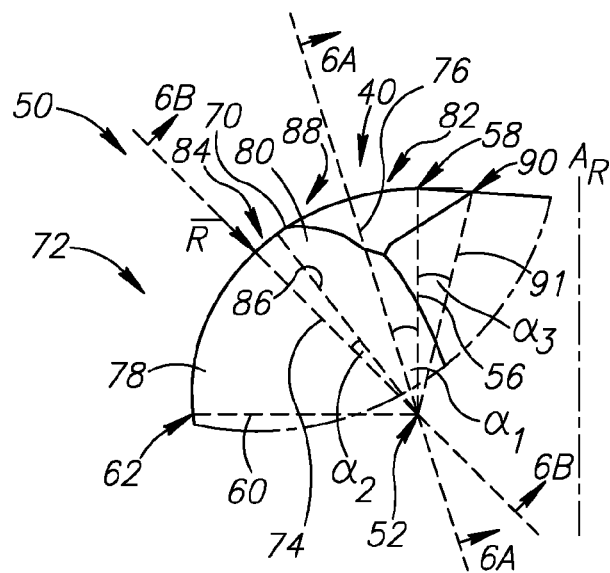
FIG. 3C is an enlarged view of a corner of the end mill in FIG. 2C.

Referring to FIGS. 2C, 3C and 4C, the cutting tooth 34B comprises a cutting edge 44 formed at an intersection of the tooth relief surface 46 (FIG. 4C) and a flute rake surface 48 (FIG. 2C), and also comprises a corner sector 50 with a corner radius R and a sector center point 52.

The corner radius R is measurable as known in the art (i.e. it can be measured by rotating an end mill in front of different sized circles (not shown) about the rotation axis $A_R$, until one of the circles having a corresponding curvature is found—i.e., during said rotation, a portion of the end mill's corner will match a portion of a corresponding-sized circle). Alternative to the example shown, some embodiments can have a corner sector extending an amount other than a quarter-circle.

Referring to FIG. 2C, a corner radius center angle 54 which extends between an imaginary axial line 56 (which extends from the sector center point 52 to an axial tangent point 58), and an imaginary radial line 60 (which extends from the sector center point 52 to a radial tangent point 62), may have an angle other than 90°, which is the angle in the present non-limiting example.

A radial tangent point 62 is one of two extreme points of the corner sector 50 (which corresponds to the corresponding-sized circle) at the periphery 42 of the end mill 10, and an axial tangent point 58 is the other extreme point at the other side of the corner sector 50, i.e. at the axial end 24 of the corner sector 50.

In the present non-limiting example, the corner radius R is 4 mm. In other words the corner radius R is 0.25D (as mentioned above the cutting portion's diameter D is 16 mm).

A blended gash of the subject matter of the present application has been found to improve performance of end mills which fulfill the condition R>0.15D.

During production thereof, the end mill 10 is first gashed with an end gash 64 (see FIG. 2A which does not comprise a blended gash) at the axial end 24. The end mill 10 is subsequently formed with a blended gash 40 (FIG. 2C).

Referring to FIGS. 2A, 3A and 4A, which shows the end mill 10 after the first step of end gashing but before the blended gash 40 is formed, the end gash 64 comprises an end gash surface 66 extending adjacent to the cutting edge 44 and the flute rake surface 48. An undesirable brisk discontinuity 68 (FIGS. 3A and 4A) is located at an intersection of the cutting edge 44, end gash surface 66 and the flute rake surface 48. The step of end gashing results in an original gash boundary 66a (FIG. 3A) between the end gash surface 66 and the flute rake surface 48, the original gash boundary 66a extending to the brisk discontinuity 68.

To remove the brisk discontinuity 68, the blended gash 40 is provided to the end mill shown in FIGS. 2A, 3A and 4A, resulting in the end mill 10 shown in FIGS. 2C, 3C and 4C. The blended gash 40 extends along the cutting edge 44 and blends the end gash surface 66 and flute rake surface 48.

For understanding, FIGS. 2B and 3B shows an end mill 10' with a prior art blended gash 40', which extends from an axial tangent point 58' all the way to a radial tangent point 62'.

FIGS. 2C and 3C show an example of a blended gash 40 in accordance with the subject matter of the present application, which is shown to end at a first extremity 70 which is spaced apart from the radial tangent point 62.

Figure 3D:
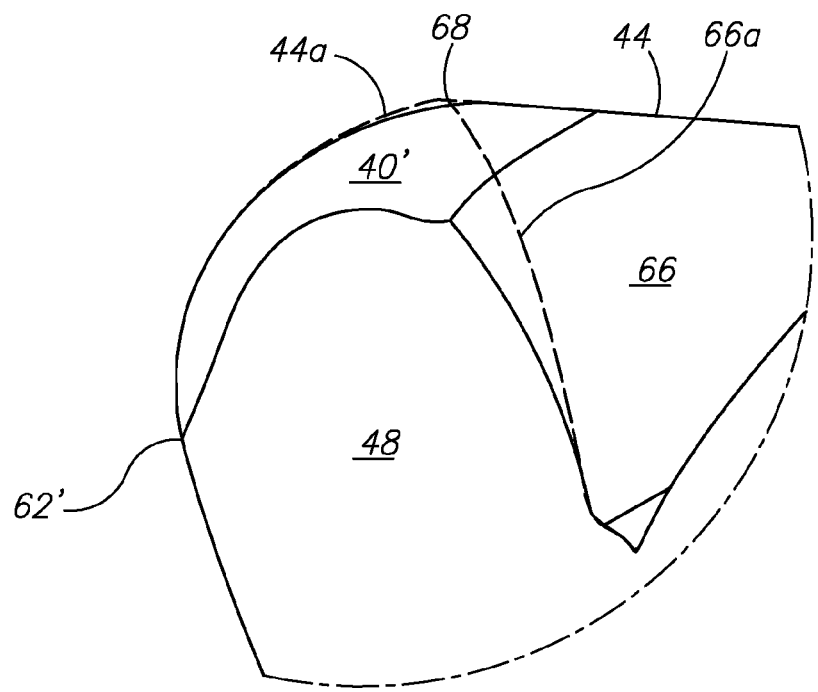
FIG. 3D shows a superposition of the corner in FIG. 3B and the corner of FIG. 3A, the latter being shown in phantom dashed lines.
Figure 3E:
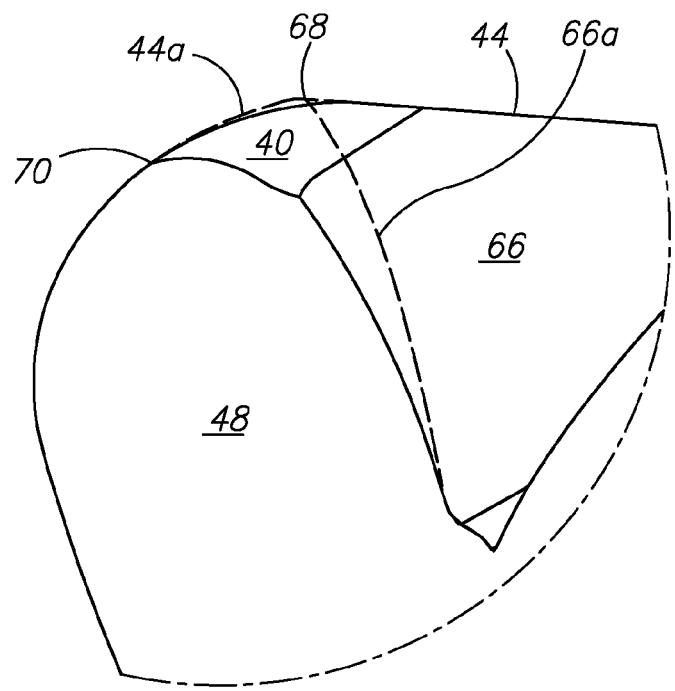
FIG. 3E shows a superposition of the corner in FIG. 3C and the corner in FIG. 3A, the latter being shown in phantom dashed lines.

FIG. 3D shows a superposition of FIG. 3B over FIG. 3A and FIG. 3E shows a superposition of FIG. 3C over FIG. 3A. Both FIGS. 3D and 3E show in phantom dashed lines the original gash boundary 66a, a removed cutting edge portion 44a, and the removed brisk discontinuity 68. Thus, FIG. 3D shows a superposition of the cutting portion of the end mill of FIG. 3B having the prior art blended gash over the cutting portion of the end mill of FIG. 3A which does not have a blended gash. Similarly, FIG. 3E shows a superposition of the cutting portion of the end mill of FIG. 3C having the blended gash in accordance with the subject matter of the present application over the cutting portion of the end mill of FIG. 3A which does not have a blended gash. Comparing FIGS. 3D and 3E, it can be seen that the subject matter of the present application has a blended gash with considerably less surface area than the prior art blended gash. It is also shown that the blended gash of the present application leaves far more of the cutting edge 44 free of gashing when compared with a prior art gash 40' which extends to the radial tangent point 62'.

Figure 6A:
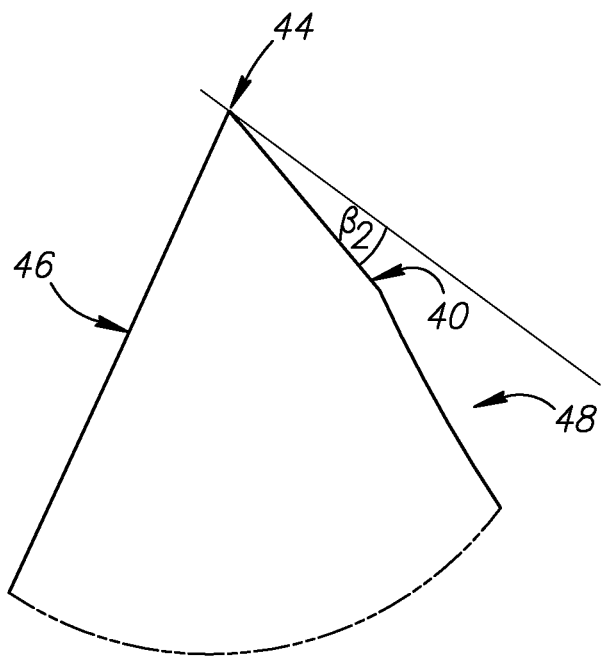
FIG. 6A is an enlarged and exaggerated cross section view taken along a portion of line 6A-6A in FIG. 3C.
Figure 6B:
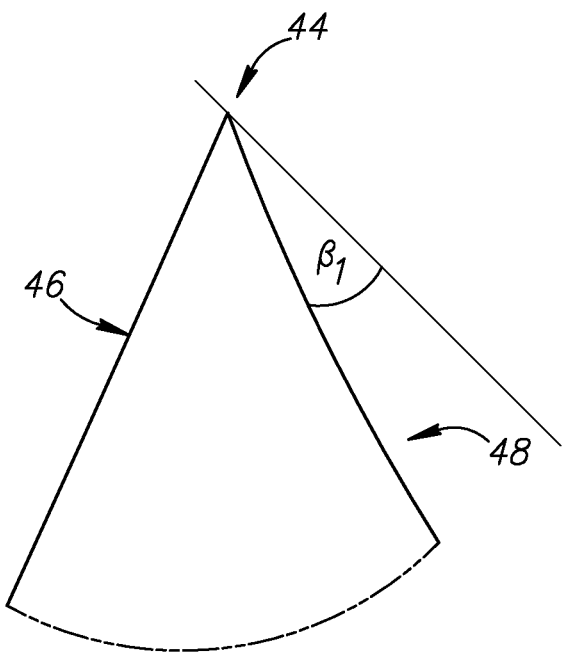
FIG. 6B is an enlarged and exaggerated cross section view taken along a portion of line 6B-6B in FIG. 3C.

FIG. 6A shows a cross-section along imaginary traverse line 76 (FIG. 3C) which passes through the blended gash 40. By contrast, FIG. 6B shows a cross-section along an imaginary line 74 which does not pass through the blended gash 40. The imaginary line 74 chosen for this explanation is bisection line 74 but could also be chosen at different positions not passing through the blended gash 40. By limiting or minimizing the extent of the blended gash 40 in a direction towards the radial tangent point 62, a corner area 72 (FIG. 3C) extending between the radial tangent point 62 and the first extremity 70, can have a corner rake angle or angles $\beta_1$ (i.e. the rake angle or angles at the non-gashed corner area 72, shown here, for example, along a bisection line 74) of a higher positive value or values than a blended gash rake angle or angles $\beta_2$ of the blended gash 40 (i.e. the rake angle $\beta_2$ at the blended gash 40, shown here, for example, along an imaginary traverse line 76; noting that the blended gash rake angle $\beta_2$ can still be a positive value or positive values, as in the present example, albeit of smaller magnitude than the corner rake angle or angles).

Preferably, the non-gashed corner area's corner rake angle or angles $\beta_1$ can be at least 5° greater than the rake angle $\beta_2$ of the blended gash 40.

To elaborate, referring to FIG. 3C, the corner sector 50 can be divided into a first half-sector 78 and a second half-sector 80.

The first half-sector 78 can extend from the imaginary bisection line 74 (which extends from the sector center point 52 to the cutting edge 44 and forms an angle of equal magnitude with the axial line 56 and the radial line 60) to the radial line 60.

The second half-sector 80 can extend from the imaginary bisection line 74 to the axial line 56. Thus, the first and second half-sectors 78, 80 subtend equal angles within the corner sector 50, about the imaginary bisection line 74.

Generally speaking, no portion of the blended gash 40 is within the first half-sector 78, and so the first half-sector 78 is devoid of any blended gash 40.

The second half-sector 80 can comprise a traverse sub-sector 82, a boundary sub-sector 84 and a central sub-sector 88 delimited by the traverse sub-sector 82 and boundary sub-sector 84.

The traverse sub-sector 82 is distally located from the first half-sector 78. The traverse sub-sector 82 has a traverse central angle $\alpha_1$ formed between the axial line 56 and a traverse line 76 which extends from the sector center point 52 to the cutting edge 44.

The boundary sub-sector 84 is immediately adjacent the first sector 78. The boundary sub-sector 84 has a boundary central angle $\alpha_2$ formed between the bisection line 74 and an imaginary boundary line 86 which extends from the sector center point 52 to the cutting edge 44.

No portion of the blended gash 40 is found in the boundary sub-sector 84. The blended gash 40 traverses the traverse sub-sector 82, and the first extremity 70 of the blended gash 40 is located in a central sub-sector 88. It will be understood that the traverse central angle $\alpha_1$ is consequently smaller than an angle (not shown) formed between the axial line 56 and an imaginary line (not shown) which extends from the sector center point 52 to the first extremity 70.

The blended gash 40 can extend to a second extremity 90 which is spaced-apart from the axial line 56 and the second half-sector 80. The second extremity 90 is located at the end of an imaginary extremity line 91, which extends from the sector center point 52 to the cutting edge 44. The imaginary extremity line 91 forms an acute extremity angle $\alpha_3$ with the imaginary axial line 56.

Figure 5:
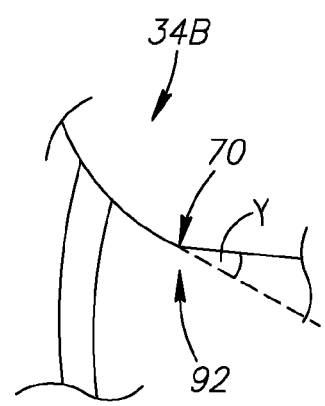
FIG. 5 is an enlarged and exaggerated view of a portion of a corner of the end mill in FIG. 4C.

As shown in FIGS. 3E and 4C, the brisk discontinuity 68 (FIG. 4A) is no longer present, however, referring now to FIG. 5, a new discontinuity 92 is formed at an intersection of the cutting edge 44, the blended gash 40 and the flute rake surface 48. Stated differently, the new discontinuity 92 is located at the first extremity 70 of the blended gash 40. A difference in position can be noted when compared with a prior art discontinuity 92' (FIG. 3B) of the prior art blended gash 40', which is located at a radial side of an end mill. The new discontinuity 92 can form a new discontinuity angle Y, which is shown in an exaggerated manner in FIG. 5 for ease of understanding.

It has been found that the blended gash 40 of the subject matter of the present application, particularly when applied to an end mill having the features described above, can significantly improve efficiency for machining aluminum.

The description above includes an exemplary embodiment for enablement, if needed, and the claims should not be interpreted as excluding non-exemplified embodiments and/or features.

The invention claimed is:

1. A corner radius end mill configured for rotating about a rotation axis ($A_R$), comprising:
    a shank portion; and
    a cutting portion extending from the shank portion and having a diameter (D);
    the cutting portion comprising:
    a helical flute having a helix angle H which fulfills the condition 20°<H<60° and comprising a flute rake surface;
    a cutting tooth comprising a cutting edge which extends adjacent to the flute rake surface, and comprising a corner sector with a corner radius R which fulfills the condition R>0.15D, a first half-sector of the corner sector extending from an imaginary bisection line of the corner sector to a radial tangent point and a second half-sector of the corner sector extending from the imaginary bisection line to an axial tangent point, the first and second half-sectors subtending equal angles about the imaginary bisection line;
    an end gash surface extending adjacent the cutting edge and the flute rake surface; and
    a blended gash extending along the cutting edge from a first extremity, and blending the end gash surface and the flute surface;
    the blended gash being spaced from a radial tangent point by a predetermined distance;
    the blended gash extending to a second extremity which is spaced apart from an imaginary axial line and the second half-sector, the imaginary axial line extending from a sector center point to the axial tangent point; and
    the second half-sector comprising a traverse sub-sector having a traverse central angle, the traverse sub-sector being distally located from the first half-sector, and wherein the blended gash extends into the second half-sector traversing the traverse sub-sector.

2. The corner radius end mill according to claim 1, wherein the first extremity is located in the second half sector.

3. The corner radius end mill according to claim 1, wherein the second extremity is located along an imaginary extremity line which extends from the sector center point to the cutting edge, the imaginary extremity line forming an acute extremity angle $\alpha_3$ with the imaginary axial line fulfilling the condition: $3° \leq \alpha_3 \leq 30°$.

4. The corner radius end mill according to claim 3, wherein the extremity angle $\alpha_3$ fulfills the condition: $5° \leq \alpha_3 \leq 20°$.

5. The corner radius end mill according to claim 4, wherein the extremity angle $\alpha_3$ fulfills the condition: $6° \leq \alpha_3 \leq 12°$.

6. The corner radius end mill according to claim 1, wherein the traverse central angle is 10°.

7. The corner radius end mill according to claim 1, wherein the traverse central angle is 25°.

8. The corner radius end mill according to claim 1, wherein the second half-sector comprises a boundary sub-sector having a boundary central angle, the boundary sub-sector extending from the imaginary bisection line, and wherein the blended gash does not extend into the boundary sub-sector.

9. The corner radius end mill according to claim 8, wherein the boundary central angle is 1° or 2°.

10. The corner radius end mill according to claim 1, wherein a discontinuity formed at an intersection of the cutting edge, blended gash and flute rake surface is located at said axial side.

11. The corner radius end mill according to claim 10, wherein the discontinuity forms at least a 1° discontinuity angle.

12. The corner radius end mill according to claim 11, wherein the discontinuity forms at most a 10° discontinuity angle.

13. The corner radius end mill according to claim 1, wherein a radial rake angle along an entirety of a radial portion of the cutting edge has positive values.

14. The corner radius end mill according to claim 1, wherein all values of the radial rake angle is equal to or greater than 5°.

15. The corner radius end mill according to claim 1, being configured for cutting workpiece materials having a Rockwell's hardness less than 42 HRc.

16. The corner radius end mill according to claim 1, wherein the helix angle H fulfills the condition $35°≤H≤45°$.

17. The corner radius end mill according to claim 1, wherein a non-gashed corner area of the corner sector at the cutting edge, which is closer than the blended gash to the radial tangent point, has a rake angle at least 5° greater than a rake angle of the blended gash at the cutting edge.

18. The corner radius end mill according to claim 17, wherein the non-gashed corner area is at boundary sub-sector of the second half-sector.

19. The corner radius end mill according to claim 1, further comprising at least one additional helical flute and associated cutting tooth comprising a blended gash.

20. The corner radius end mill according to claim 1, wherein a helix range HR of all teeth of the corner radius end mill is equal to or less than two degrees multiplied by the number of teeth Z (helix range $HR≤2Z$).

* * * * *